(12) United States Patent
Connor, Jr. et al.

(10) Patent No.: US 10,604,426 B2
(45) Date of Patent: Mar. 31, 2020

(54) HIGH EFFICIENCY ELECTROCHEMICAL DESALINATION SYSTEM THAT INCORPORATES PARTICIPATING ELECTRODES

(71) Applicant: Magna Imperio Systems Corp., Houston, TX (US)

(72) Inventors: Michael James Connor, Jr., Porter, TX (US); Brian M. McDonald, Houston, TX (US); Grant R. Page, Chico, CA (US)

(73) Assignee: Magna Imperio Systems Corp., Houston, TX (US)

( * ) Notice: Subject to any disclaimer, the term of this patent is extended or adjusted under 35 U.S.C. 154(b) by 178 days.

(21) Appl. No.: 15/390,165

(22) Filed: Dec. 23, 2016

(65) Prior Publication Data
US 2018/0179089 A1    Jun. 28, 2018

(51) Int. Cl.
| | | |
|---|---|---|
| C02F 1/46 | (2006.01) | |
| C02F 1/42 | (2006.01) | |
| C02F 1/461 | (2006.01) | |

(52) U.S. Cl.
CPC .............. *C02F 1/4604* (2013.01); *C02F 1/42* (2013.01); *C02F 2001/46138* (2013.01); *C02F 2201/4613* (2013.01); *C02F 2201/46115* (2013.01); *C02F 2201/46185* (2013.01)

(58) Field of Classification Search
None
See application file for complete search history.

(56) References Cited

U.S. PATENT DOCUMENTS

| | | |
|---|---|---|
| 3,933,610 A * | 1/1976 | Ehara et al. |
| 6,656,628 B2 | 12/2003 | Chang et al. |
| 2005/0098436 A1 | 5/2005 | Miwa et al. |
| 2006/0249390 A1 | 11/2006 | Yan et al. |
| 2011/0089036 A1 | 4/2011 | Sparrow et al. |
| 2012/0135282 A1 | 5/2012 | La Mantia et al. |

(Continued)

FOREIGN PATENT DOCUMENTS

| | | |
|---|---|---|
| FR | 2996780 | 4/2014 |
| JP | 2013-012322 | 1/2013 |

(Continued)

OTHER PUBLICATIONS

International Search Report and Written Opinion dated Jan. 12, 2018, directed to International Application No. PCT/US2017/057800; 12 pages.

(Continued)

*Primary Examiner* — Arun S Phasge
(74) *Attorney, Agent, or Firm* — Morrison & Foerster LLP

(57) ABSTRACT

The present invention discloses an apparatus and a method to desalinate aqueous solution. The apparatus disclosed herein comprises at least two electrodes and at least one ion selective membrane in continuous contact with the aqueous solution that is contained in the internal space created by connecting a top manifold and a bottom manifold of the apparatus. The ion selective membrane(s) are arranged in such a manner as to enable reversing the flow of the charged particles by direct or indirect means. The electrodes in this apparatus may be made of material that reversibly reacts with chlorides in water.

35 Claims, 11 Drawing Sheets

(56) References Cited

U.S. PATENT DOCUMENTS

| | | |
|---|---|---|
| 2012/0292187 A1 | 11/2012 | Kim et al. |
| 2013/0327711 A1 | 12/2013 | Hickenbottom et al. |
| 2014/0272484 A1 | 9/2014 | Li et al. |
| 2015/0357651 A1 | 12/2015 | Page |

FOREIGN PATENT DOCUMENTS

| | | |
|---|---|---|
| WO | 2009/077992 | 6/2009 |
| WO | 2010/115287 | 10/2010 |
| WO | 2011/050473 | 5/2011 |
| WO | 2015138599 | 9/2015 |
| WO | 2016113139 | 7/2016 |

OTHER PUBLICATIONS

Electrodialysis Reversal Technology (Jul. 2013) "GE 2020 EDR Systems Fact Sheet," located at https://www.gewater.com/kcpguest/documents/Fact Sheets Cust/Americas/English/FS1242EN.pdf visited on Jul. 31, 2013. (3 pages).

International Search Report and Written Opinion dated Jan. 26, 2016, directed to PCT Application No. PCT/US2015/035044; 11 pages.

Kim et al. (Feb. 2013) "Energy Harvesting From Salinity Gradient by Reverse Electrodialysis With Anodic Alumina Nanopores", Energy 51: 413-421.

Page, Office Action dated Oct. 19, 2016, directed to U.S. Appl. No. 14/734,652; 10 pages.

Smith et al. (Jan. 2016). "Na-Ion Desalination (NID) Enabled by Na-Blocking Membranes and Symmetric Na-Intercalation: Porous-Electrode Modeling," Journal of The Electrochemical Society 163 (3): A530-A539.

The Water Network, AquaSPE. (Feb. 2016) "New Sodium-Ion Desalination," located at https://thewaternetwork.com/article-FfV/new-sodium-ion-desalination-15YwaAMDbpUCpbYC4vT9gw visited on Feb. 23, 2016. (3 pages).

* cited by examiner

HIGH EFFICIENCY ELECTROCHEMICAL DESALINATION SYSTEM THAT INCORPORATES PARTICIPATING ELECTRODES

FEDERAL FUNDING LEGEND

This invention was not created using federal funds.

BACKGROUND OF THE INVENTION

Field of the Invention

The present invention generally relates to removal of charged particles from aqueous solution. More specifically, the present invention discloses an apparatus and methods to remove charged particles from salt water using electrochemical reactions.

BACKGROUND

For the past forty years, reverse osmosis (RO) has been the market leader for desalination and there has been very little innovation in this process. The innovation that has occurred has been focused on energy recovery, not on energy reduction, which has only allowed for minor improvements and has hit a practical limit of 2.0 kWh/m$^3$. Most large plants have high operating expenses and typically fifty percent of the operating expenses are attributed to the energy dedicated to the desalination equipment. Additionally, most of the other desalination technologies have a limited range for total dissolved solids (TDS) over which they can operate, which increases the complexity of process designs. Furthermore, most of the electrochemical processes use inert materials, which makes it necessary to have gas collectors at the anode and the cathode to collect the emitted gases.

Thus, there is a long-standing need in the art for an apparatus and method to remove charged particles from aqueous solution, for instance, salt water, using electrochemical reactions, which is energy efficient, economical, allows removal of TDS over a broad range and has minimal off gassing. The present invention satisfies this long-standing need in the art.

SUMMARY OF EMBODIMENTS OF THE INVENTION

In a preferred embodiment, the present invention is directed to an apparatus, comprising: a plate, a casing or a combination of a plate and casing comprising at least two outlets; a plate, a casing or a combination of a plate and casing comprising at least one inlet manifold, the at least one inlet manifold carries the aqueous solution into the apparatus; wherein the plate, casing or the combination of a plate and casing defines an internal space between the inlets and outlets; at least one electrode set displaced in the internal space and in communication with an aqueous solution to be desalinated, the electrode set comprising: a cathode, wherein the cathode is made of material that reversibly reacts with chloride and is insoluble in water; and an anode, wherein the anode is made of material that reversibly reacts with chloride and is insoluble in water, an ion exchange membrane system comprising at least one cationic exchange membrane or anionic exchange membrane or both placed in between the at least one electrode set and in communication with the aqueous solution; and a connector electrically connecting the cathode and the anode to an electrical power supply to form an electrical circuit.

In another related embodiment, the apparatus further comprises a valving system that comprises: a 4-way, 2 position valve or more than one 2-way, 2-position valves. In yet another related embodiment, the apparatus further comprises at least two outlet manifolds, the outlet manifolds located inside the apparatus and connected to each of the outlets individually. In further yet another related embodiment, the direction of flow of charged particles in the apparatus is reversed by changing the polarity on the electrical circuit. In still yet another related embodiment, at least one of the two outlets is an outlet for aqueous brine solution and at least one of the two outlets is an outlet for desalinated water. In another related embodiment, at least one inlet is an inlet for salinated aqueous solution. In still yet another related embodiment, the cathode is made of silver and coated with chloride. In further yet another related embodiment, the cathode is coated by hot dipping, cold dipping, electro-deposition, immersion, or a combination thereof. In still further yet another related embodiment, the anode is made of silver. In yet another related embodiment, a current collector is attached to the cathode, the anode or both by electrical connection. In yet another related embodiment, the current collector is made of titanium, graphite, or a combination thereof, the current collector having a planar, felt, woven cloth structure, or a combination thereof.

In another related embodiment, the ion exchange membrane system comprises a cationic exchange membrane. In another related embodiment, the ion exchange membrane system comprises a cationic exchange membrane placed near the cathode, another cationic exchange membrane placed near the anode and one anionic exchange membrane placed in between the cationic exchange membranes. In still another related embodiment, the ion exchange membrane system comprises more than one cationic exchange membrane and more than one anionic exchange membrane, wherein one of the anionic exchange membrane is placed in between two of the cationic exchange membranes. In yet another related embodiment, the ion exchange membrane comprises a polymer structure that comprising polytetrafluoroethylene, polyether ether ketone, or gel polystyrene crosslinked with divinylbenzene or analogs or derivatives thereof, or a combination thereof. In still yet another related embodiment, the cationic exchange membrane comprises a polymer membrane pretreated in sodium chloride, wherein the membrane comprises sulfonic acid functional group, carboxylic acid, phosphonic acid, monosulfate ester, mono- and diphosphate ester groups, hydroxylic groups of phenol, thiol, perfluoro tertiary alcohol groups, or other functional groups providing a fixed negative charge or derivatives or analogs thereof, or a combination thereof. In yet another related embodiment, the anionic exchange membrane comprises a polymer membrane pretreated in sodium chloride, wherein the membrane comprises primary, secondary, or tertiary amino groups, quaternary ammonium functional group, tertiary sulfonium groups, quaternary phosphonium groups, cobaltocenium groups or other functional groups providing a fixed positive charge or derivatives or analogs thereof, or a combination thereof. In further yet another related embodiment, space between each of the ion selective membranes is from about 0.005" to about 0.050" or from about 0.001" to about 0.500". In still yet another related embodiment, the apparatus is run in a continuous mode or a batch mode.

In another preferred embodiment, the present invention is directed to an apparatus, comprising: a plate, a casing or a combination of a plate and casing comprising: at least one inlet to deliver an aqueous solution to be desalinated; at least one inlet to deliver an anolyte solution; at least one inlet to deliver a catholyte solution; at least one outlet to deliver the aqueous solution after desalination; at least one outlet to deliver the anolyte solution out of the apparatus; at least one outlet to deliver the catholyte solution out of the apparatus; wherein the plate, casing or a combination of plate and casing defines an internal space in between the inlets and outlets; at least one electrode set displaced in the internal space, the electrode set comprising: a cathode, wherein the cathode made of material that reversibly reacts with chloride; and an anode, wherein the anode is made of material that reversibly reacts with chloride; an ion exchange membrane system comprising at least one cationic exchange membrane and at least one anionic exchange membrane placed in between the at least one electrode set and in communication with the aqueous solution; and a connector electrically connecting the cathode and the anode to an electrical power supply to form an electrical circuit.

In another related embodiment, the apparatus further comprises: a pump to deliver the anolyte solution and a pump to deliver the catholyte solution; or a pump to deliver both the anolyte solution and the catholyte solution. In yet another related embodiment, the anolyte solution and the catholyte solution are recirculated or collected in a single reservoir. In still yet another related embodiment, the anolyte solution and the catholyte solution is delivered to the apparatus by an inlet that is separate from the inlet that delivers the aqueous solution to be desalinated. In further yet another related embodiment, the cathode is made of silver and coated with chloride. In still further yet another related embodiment, the cathode is coated by hot dipping, cold dipping, electro-deposition, immersion, or a combination thereof. In another related embodiment, the anode is made of silver. In yet another related embodiment, a current collector is attached to the cathode, the anode or both by electrical connection. In still yet another related embodiment, the current collector is made of titanium, graphite, or a combination thereof, said current collector having a planar, felt, woven cloth structure, or a combination thereof. In yet another related embodiment, the ion exchange membrane system comprises: a cationic exchange membrane placed near the cathode, another cationic exchange membrane placed near the anode and one anionic exchange membrane placed in between the cationic exchange membranes. In still another related embodiment, the ion exchange membrane system comprises more than one cationic exchange membrane and more than one anionic exchange membrane, wherein one of the anionic exchange membranes is placed in between two of the cationic exchange membranes.

In yet another related embodiment, the ion exchange membrane comprises a polymer structure that comprising polytetrafluoroethylene, polyether ether ketone, or gel polystyrene crosslinked with divinylbenzene or analogs or derivatives thereof, or a combination thereof. In another related embodiment, the cationic exchange membrane comprises a polymer membrane pretreated in sodium chloride, wherein the membrane comprises sulfonic acid functional group, carboxylic acid, phosphonic acid, monosulfate ester, mono- and diphosphate ester groups, hydroxylic groups of phenol, thiol, perfluoro tertiary alcohol groups, or other functional groups that provide a fixed negative charge, or derivatives or analogs thereof, or a combination thereof. In yet another related embodiment, the anionic exchange membrane comprises a polymer membrane pretreated in sodium chloride, wherein the membrane comprises primary, secondary, or tertiary amino groups, quaternary ammonium functional group, tertiary sulfonium groups, quaternary phosphonium groups, cobaltocenium groups or other functional groups that provide a fixed positive charge or derivatives or analogs thereof, or a combination thereof. In still yet another related embodiment, space between each membrane of the membrane system is from about 0.005" to about 0.050" or from about 0.001" to about 0.500". In further yet another related embodiment, the anolyte solution comprises an aqueous salt solution containing chloride ions provided by a dissolved salt, wherein the dissolved salt is sodium chloride or potassium chloride. In yet another related embodiment, the catholyte solution comprises an aqueous salt solution containing chloride ions provided by a dissolved salt, wherein the dissolved salt is sodium chloride or potassium chloride.

BRIEF DESCRIPTION OF THE FIGURES

FIG. 9A shows a typical voltage profile for system in the apparatus under a constant current application. FIG. 9B shows the valve positions and flow paths for diluate and concentrate at state T1 from FIG. 9A.

DETAILED DESCRIPTION

The present invention provides an integrated system that effectively removes charged particles from an aqueous solution via electrochemical reactions. More specifically, the present invention discloses a system, an apparatus and methods to remove charged particles from salt water via electrochemical reactions.

Figure 1:
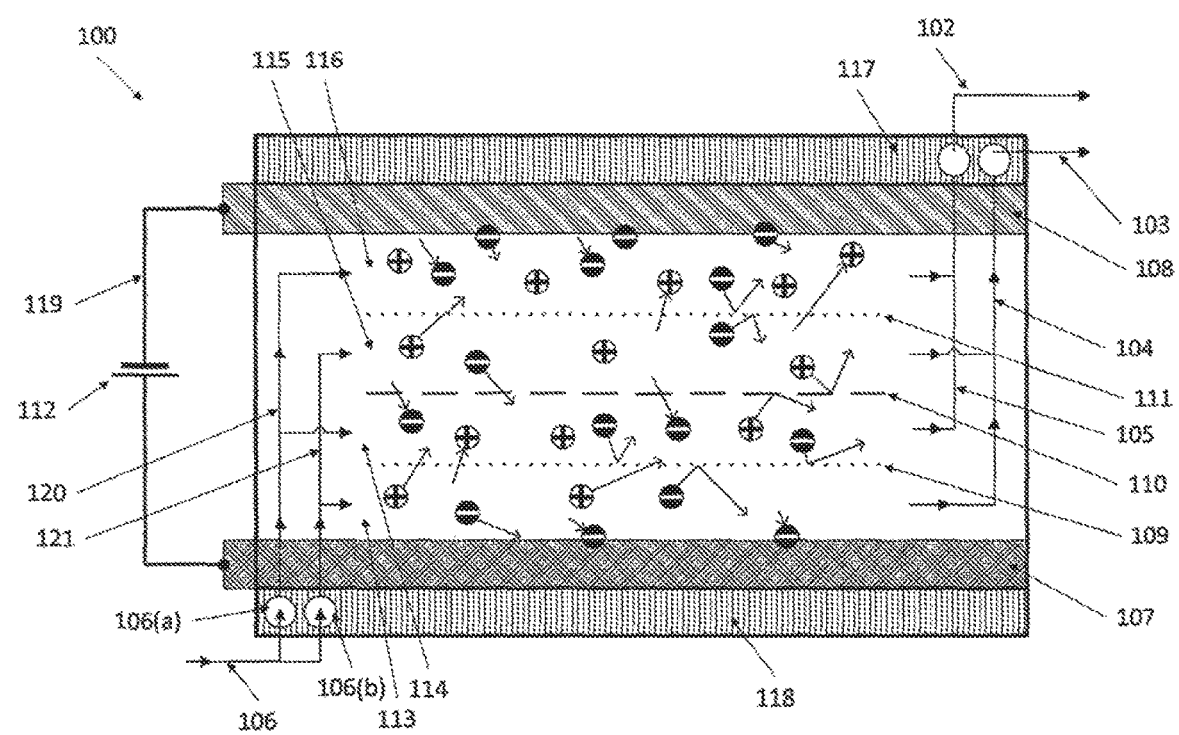
FIG. 1 shows a detailed schematic representation of how the ions act inside of the apparatus described herein.

In a preferred embodiment as shown in FIG. 1, the apparatus 100 disclosed herein, comprises a top compression plate 117 and bottom compression plate 118, where the top compression plate 117 provides fluid passage to a top left outlet manifold 102 and top right outlet manifold 103, where the bottom compression plate 118 provides fluid passage to an inlet manifold 106 and from there to inlets 106a and 106b. In one embodiment, the outlet manifolds 102 and 103 are used to discharge brine and water that has been desalinated or product water, respectively. The inlet manifold 106 is used to introduce the aqueous solution to be desalinated.

The apparatus 100 depicted in FIG. 1 demonstrates a plate and frame type design, wherein the compression plates 117 and 118 hold the membrane assembly comprising ion selective membranes, for instance, a cationic exchange membrane (CEM) 109 and a CEM 111, and one anionic exchange membrane (AEM) 110 and electrodes for instance, a cathode 108 and an anode 107, in close contact and provides inlets and outlets for fluids contained within the apparatus 100. The compression plates may provide a force via bolts or an externally applied load that will allow the layers of the apparatus 100 to seal internally and externally. Another embodiment, uses an adhesive, epoxy, or tape to provide the seal, but still requires a plate or casing to allow fluid access to the apparatus. In yet another embodiment, a cylindrical or tubular casing with manifolds on the ends or sides can provide the enclosure for the electrodes, membrane assembly and channels for fluid passage. For example, the electrodes may be located as two concentric tubes in the internal space defined by the tubular casing with layers of membrane displaced between said electrodes. In each of these embodiments, the arrangement of electrodes and membranes remains the same, with membrane assembly between the cathode and anode, but are arranged in a manner that best utilizes the geometry of the casing and sealing technique.

The apparatus 100 further comprises a means to supply power 112. In one embodiment, AC power 120 VAC, is used to power a rectifier, which converts the AC to DC and applies preferentially a current density of 2 to 5 $mA/in^2$ to the electrodes but the current density could be in the range of 0.1 mA/in2 to 1000 $mA/in^2$ and the DC power is preferentially in a constant current mode. In another embodiment, constant voltage operation may also be employed to avoid a secondary reaction at the electrode surface. The amount of current required to have a certain amount of mass gain on the anode and the mass loss on the cathode can be calculated by using Faraday's law of electrolysis. The amount of mass gain on the anode and the mass loss on the cathode correlates to a certain amount of salt removal. The mass transfer at the electrode surface can then be multiplied by the number of membrane pairs to calculate the total mass of ions transferred across the system, where a membrane pair comprises a CEM 109 and a AEM 110 pair located adjacent to each other. In the apparatus shown in FIG. 1, there are two CEMs 109 and 111, and one AEM 110. In another embodiment, the apparatus 100 may comprise at least one AEM 110. In yet another embodiment, the apparatus 100 may comprise one CEM 109.

The apparatus 100 comprises an anode 107 and a cathode 108 set disposed in the internal space created by the casing connecting the top compression plate 117 and the bottom compression plate 118. The anode 107 can be made of materials such as silver, or any other material with a reversible reaction with chloride. In one embodiment, the anode 107 is made of a primarily silver based material, which can be electroplated or raw material. The surface area can be increased through several methods including mechanical methods, electrochemical methods or a combination of these methods. The examples of mechanical methods include but are not limited to abrasion, stamping, engraving, or a combination thereof. Additionally, the examples of electrochemical methods include but are not limited to dealloying, atomic layer deposition, physical vapor deposition, chemical vapor deposition, etching, or a combination thereof. Increasing the surface area allows for higher current densities per unit planar area of electrode and increases the total amount of mass gain per unit area. Additionally, the anode 107 may have a current collector, which is made of material including, but not limited to, titanium, graphite, or a combination thereof that has either planar, felt, woven cloth structure, or a combination thereof.

The cathode 108 can be made of materials such as silver or any other material with a reversible reaction with chloride, which is then coated with chloride. In one embodiment, the cathode 108 is made of primarily silver material, which is then coated with chloride to form a surface of AgCl. In another embodiment, the cathode 108 may be coated by hot dipping, cold dipping, electrodeposition, immersion or a combination thereof. The anode 107 and the cathode 108 are connected to the DC power supply 112 using an electrical connection 119 comprised of conductive material including but not limited to copper, titanium, silver wire, or a combination thereof.

In another embodiment, the apparatus 100 described herein may further comprise one or more layers of gaskets and ion selective membranes, with or without supports or spacers, disposed between the anode 107 and the cathode 108. As discussed herein, the ion selective membranes comprise both cationic and anionic exchange membranes, which selectively allow either positively charged ions or negatively charged ions to permeate through them. This is referred to as permselectivity. There is a performance tradeoff between permselectivity and ionic conductivity of the membrane. In one embodiment, the In yet another related embodiment, the ion exchange membrane comprises a polymer structure comprising polytetrafluoroethylene, polyether ether ketone, or gel polystyrene crosslinked with divinylbenzene or analogs or derivatives thereof, or a combination thereof. The spacing between the membranes is minimized to reduce resistance but not so much as to increase the pressure drop to unreasonable amount. There is typically less than 100 pounds per square inch drop per stage, where a stage is one set of electrodes and a membrane assembly. A good spacing is from about 0.005" to about 0.050" but could be anywhere from about 0.001" to about 0.500".

In another preferred embodiment, the spacers and/or supports are used to increase the internal Reynolds number within a stage, which affects the amount of turbulence. The flow of the fluid into and out of the system should be laminar or something less than 15 feet per second. In another embodiment, the spacers allow for each membrane pair to have similar spacing, which alleviates any concerns of closing flow paths between layers due to pressure gradients across the stage.

In instances where the anode is made of silver based material, the silver (Ag) is oxidized to silver chloride (AgCl) at the anode. This reaction involves the loss of an electron by silver atoms causing dissolution of the substrate surface into a layer of AgCl. As AgCl formation increases, the energy to incorporate more chlorides gradually increases. As the anode oxidizes, the material that makes up the cathode undergoes reduction. If the cathode is comprised of silver with a layer of AgCl coated on its surface, as the electrons are delivered to the cathode, the AgCl reduces to solid silver ($Ag_{(s)}$) and releases chlorides ($Cl^-$) into the solution.

The incorporation of chloride ions on the anode surface generates a charge imbalance in the solution in contact with the anode. This development of positive charge in the solution drives the transfer of sodium (Na⁺) across the cationic exchange membrane(s) in the direction of the cathode. Subsequently, AgCl at the cathode reduces to and releases Cl⁻ ion into the solution creating a negative charge, which is balanced by transfer of Na⁺ across the cationic exchange membrane. In instances where the apparatus comprises multiple membrane pairs, the transfer of positively charged particle across each cationic exchange membrane will draw a negatively charged particle across the adjacent anionic exchange membrane. This transfer will cascade across each membrane pair up until the cathode solution chamber. The result of these ionic transfers is a net loss in salt concentration in the anode chamber and net gain in the cathode chamber. In the multiple membrane configuration, the diluate and concentrate streams alternate in each adjacent chamber starting with the diluate at the anode and ending with concentrate at the cathode.

During the coating of the AgCl on the Ag, micro-channels are formed on the anode and cathode that allow for charge transfer, which converts the ionic current to electron current. Oxidation takes place at the anode and reduction takes place at the cathode. Once enough mass gain on the anode and/or mass loss at the cathode are achieved, the system can be reversed. The system in the apparatus described herein has a unique configuration in that it allows for minimal dwell period. The unique configuration comprises arranging the membrane(s) in a manner so that a cationic exchange membrane is always in communication with solutions at each electrode, which along with the electrode chemistry, allows the system to run in both directions. Ag/AgCl redox reactions at the electrodes are highly reversible, which allows the system to run in either direction by simply flipping the polarity on the DC power supply and continuing treatment of water. In another preferred embodiment, the apparatus further comprises external valving that includes but is not limited to a 4-way, 2 position valve or an assembly of 2-way, 2-position valves. This valving is necessary to switch the diluate and concentrate streams upon reversal of the electrode polarity.

FIG. 1 is a schematic representation of one of the preferred embodiments of the present invention. It shows how the ions behave inside the apparatus. In this figure, the cations are illustrated as white circles with pluses on them and the anions are illustrated as black circles with minuses on them. This correlates with the fact that cations are positively charged ions and anions are negatively charged ions. The apparatus 100 in this figure comprises three membranes, i.e. a CEM 109 on the bottom and CEM 111 on the top, both of which are illustrated by dotted lines. These two CEMs 109 and 111 sandwich an AEM 110 illustrated by a dashed line. Although this is the preferred location for the CEM and AEM in the apparatus 100, the apparatus 100 may comprise other variable locations for the CEM and AEM. In one embodiment, the cationic exchange membrane comprises a polymer membrane pretreated in sodium chloride, wherein the membrane comprises sulfonic acid functional group, carboxylic acid, phosphonic acid, monosulfate ester, mono- and diphosphate ester groups, hydroxylic groups of phenol, thiol, perfluoro tertiary alcohol groups, or other functional groups that provide a fixed negative charge, or derivatives or analogs thereof, or a combination thereof. In yet another embodiment, the anionic exchange membrane comprises a polymer membrane pretreated in sodium chloride, wherein the membrane comprises primary, secondary, or tertiary amino groups, quaternary ammonium functional group, tertiary sulfonium groups, quaternary phosphonium groups, cobaltocenium groups or other functional groups that provide a fixed positive charge or derivatives or analogs thereof, or a combination thereof.

These membranes divide or partition the internal space of the apparatus 100 into four different fluid chambers, for instance first fluid chamber 113, second fluid chamber 114, third fluid chamber 115, and fourth fluid chamber 116, which have manifolds in the left and the right. The left internal inlet manifold 120 distributes the incoming aqueous solution to be concentrated into chambers 114 and 116. The left internal inlet manifold 121 distributes the incoming aqueous solution to be desalinated into chambers 113 and 115. The fourth fluid chamber 116 and first fluid chamber 113 are in fluid communication with the electrodes. The bottom electrode is the anode 107 and the surface of this anode 107 is primarily silver (Ag). The top electrode is the cathode 108 and its surface is primarily silver chloride (AgCl) coated on a primarily silver substrate. During the operation, the bottom electrode or anode 107 has a positive surface charge, which attracts negative chloride ions, Cl⁻, and repels sodium ions, Na⁺. The Cl⁻ in the chamber closest to the anode reacts with the available Ag sites on the anode, resulting in the following overall spontaneous oxidation reaction:

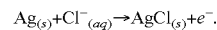

$$Ag_{(s)} + Cl^-_{(aq)} \rightarrow AgCl_{(s)} + e^-.$$

The top electrode or the cathode 108 has the following opposite overall reduction reaction occurring:

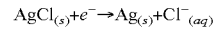

$$AgCl_{(s)} + e^- \rightarrow Ag_{(s)} + Cl^-_{(aq)}$$

The reaction at the cathode 108 causes the release of C into the fluid chamber 116 closest to it. This leads to charge imbalances, in which the apparatus/desalination cell must balance out. The combination of the charged particles being removed in the bottom chamber 113 and being added in the top chamber 116, and the surface charges of the electrodes, drives a cascade of transfers through all the chambers described herein between the electrodes. The system in this apparatus must balance out all the charge imbalances and this is accomplished by migration of the cations towards the cathode 108 and the anions towards the anode 107.

The CEMs 109 and 111 preferentially allow positively charged particles to permeate through while the AEM 110 preferentially allows the negatively charged particles to permeate through. In one embodiment, the CEM has negatively charged functional groups, including but not limited to sulfonic acid, which facilitates the transfer of a positively charged exchange ion such as sodium (Na⁺). The AEM has positively charged functional groups such as quaternary ammonium that facilitates the transfer of negatively charged exchange ion such as chloride (Cl⁻).

As the water passes through the 1ˢᵗ fluid chamber 113 and 3ʳᵈ fluid chamber 115, it becomes depleted of ions. The fluid depleted of ions exits fluid chambers 113 and 115 where they are combined in the right internal manifold 104 prior to discharge. The 2ⁿᵈ fluid chamber 114 and 4ᵗʰ fluid chamber 116 becomes concentrated with ions. The fluid concentrated with ions exits fluid chambers 114 and 116 where the streams are combined in the right internal manifold 105 prior to discharge.

The ionic current is between the anode 107 and cathode 108 and a conductor 119 placed external to the system provides a means for electric current. Power is applied to the system with a DC power supply 112, wherein the positive lead is connected to anode 107 and the negative lead is connected to the cathode 108. Since this desalination system can operate at very low DC voltages, it can be easily powered by renewable power sources including but not limited to photovoltaic (PV) rays, wind, wave, geothermal, and similar power sources.

In another embodiment, the apparatus described herein comprises only one CEM between the electrode pair. This embodiment will have one diluate and one concentrate stream internal to the system. Increasing the number of membrane pairs, for instance, the cationic and anionic exchange membranes, allows for a greater capacity of water treatment per electrode pair.

In another embodiment, the membrane assembly terminates with an anionic exchange membrane near the anode. In this embodiment, the electrode materials would be reversed by a separate regeneration cycle or by some mechanical means when either the chloride layer on the cathode is depleted or electrical resistance at the anode becomes too great.

In yet another embodiment, the ion selective membranes are pre-treated in sodium chloride to ensure that the functional sites are occupied by $Na^+$ and $Cl^-$. Examples of some membrane materials include but are not limited to polymer electrolyte membranes functionalized with sulfonic acid and quaternary ammonium functional groups for the cationic and anionic exchange membrane, respectively. Other membrane types include but are not limited to inorganic ceramic and non-functionalized polymer membranes. In another embodiment, a membrane that limits the diffusion of co-ions and water is preferred and is typically achieved with a thicker membrane. However, this must be weighed against the increase in voltage drop across the membrane. Some electroosmotic diffusion may occur across the membranes, which will act to reduce the rate of recovery of processed water.

Figure 2:
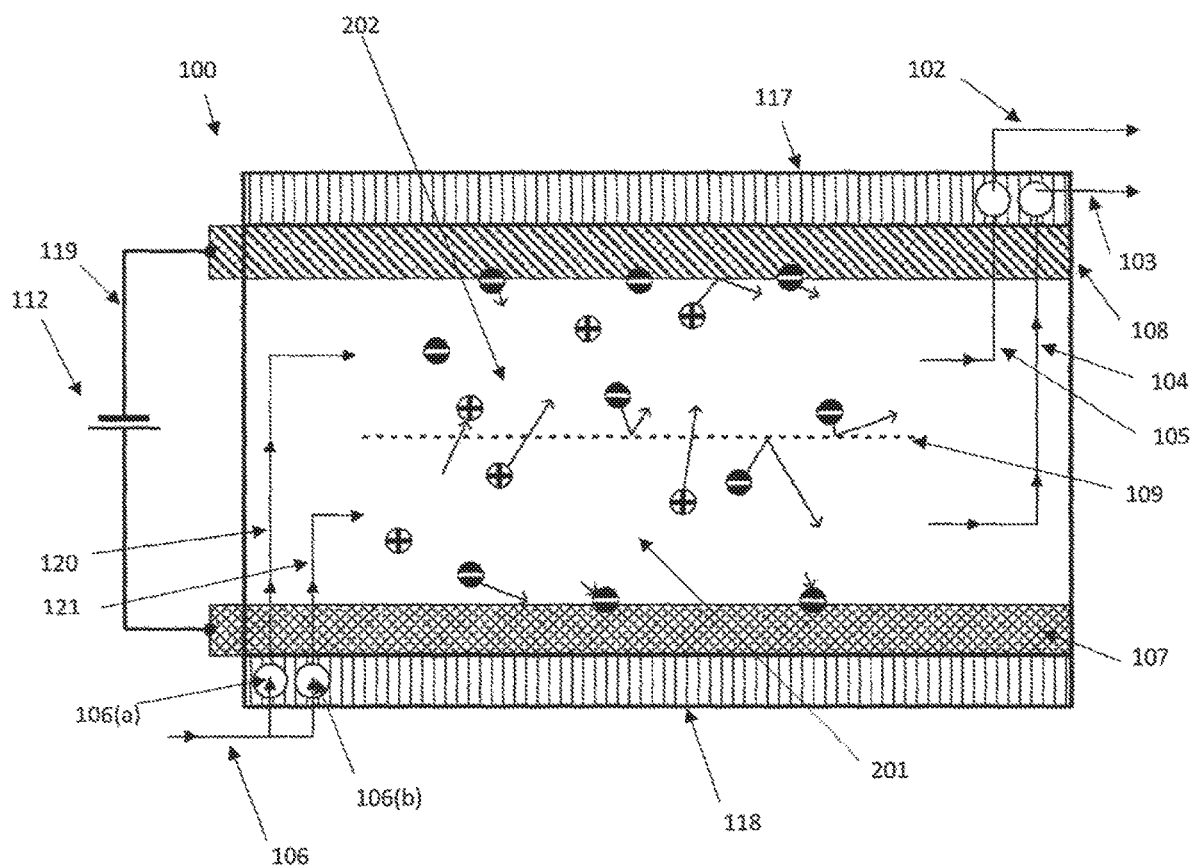
FIG. 2 shows a detailed schematic representation of how the ions act inside of the apparatus with a single cationic membrane disposed between a pair of electrodes.

FIG. 2 is a schematic representation of another embodiment of the present invention that shows the apparatus 100 operating with a single CEM 109. The fluid to be processed is delivered to the system by means of an inlet manifold 106 that separates the stream into two streams. One stream is delivered to the anode chamber 201 below the CEM 109 and the other is delivered to the cathode chamber 202 above the CEM 109. Upon applying an electric current to the apparatus 100, the anode 107 undergoes oxidation removing negatively charged ions from the solution and incorporating them on the surface of the electrode. At the same time, the cathode 108 undergoes reduction on its surface releasing a negative ion into the cathode chamber 202. This net reaction causes a positive ion to be forced across the CEM 109, which is permselective for positive ions, from the anode chamber 201 into the cathode chamber 202. As a result, the fluid in the anode chamber 201 reduces in ion concentration, while the fluid in the cathode chamber 202 increases in ion concentration. The process fluid with reduced ion concentration is removed from the apparatus 100 via a dedicated outlet manifold 102. The concentrated brine solution is removed from the apparatus 100 via a dedicated outlet manifold 103.

Figure 3:
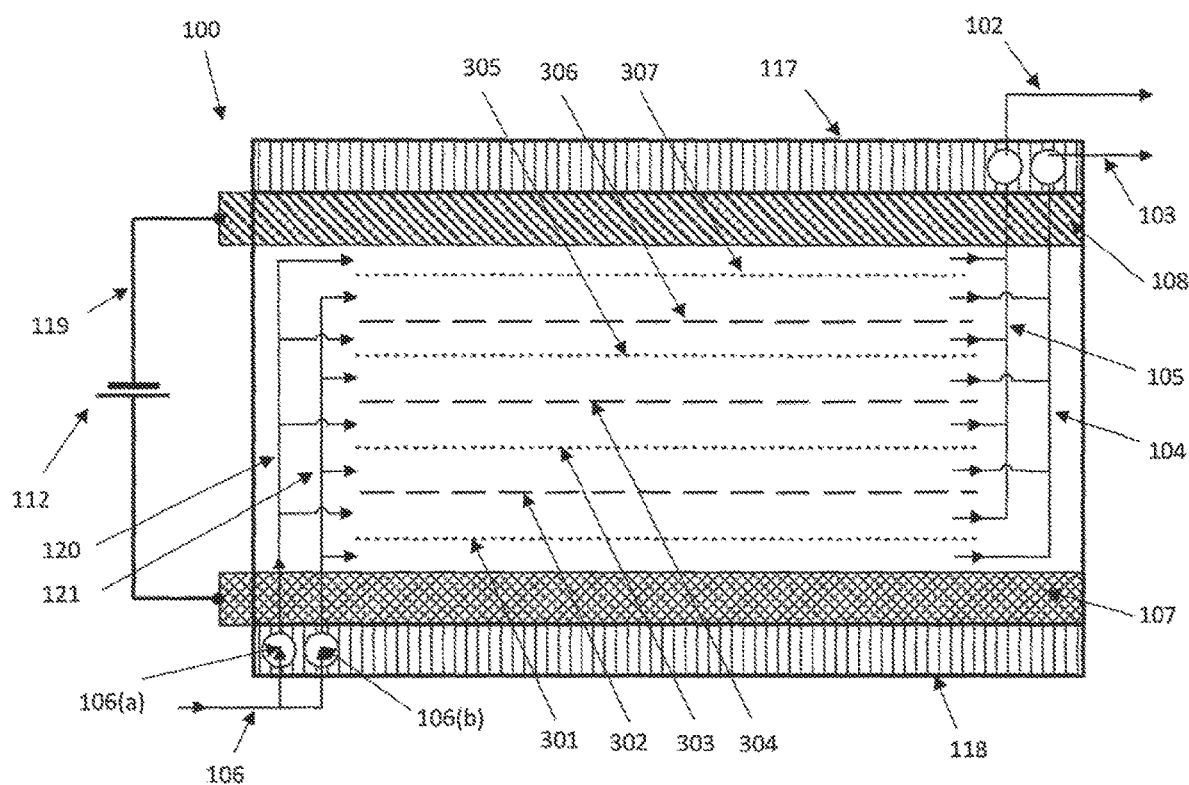
FIG. 3 shows a simplified schematic representation of how many more pairs of membranes can be added between the electrodes and increase the number of ion transfers onto many more fluid chambers for a single electrode pair.

FIG. 3 is a schematic representation of yet another embodiment that shows how the addition of pairs of membranes between the electrodes increases the quantity of fluid chambers between the electrodes. This increases the number of ion transfers for every redox reaction at the electrode surfaces, which allows a greater amount of water to be treated per pair of electrodes. The addition of membranes will require a greater amount of voltage to be applied to the system due to the increased resistance of the membrane assembly between the electrodes. In this figure, the apparatus 100 comprises seven ion selective membranes, for instance there are four CEMs 301, 303, 305 and 307 and three AEMs 302, 304, and 306. All the other components in FIG. 3 are the same as discussed in FIG. 1.

Figure 4:
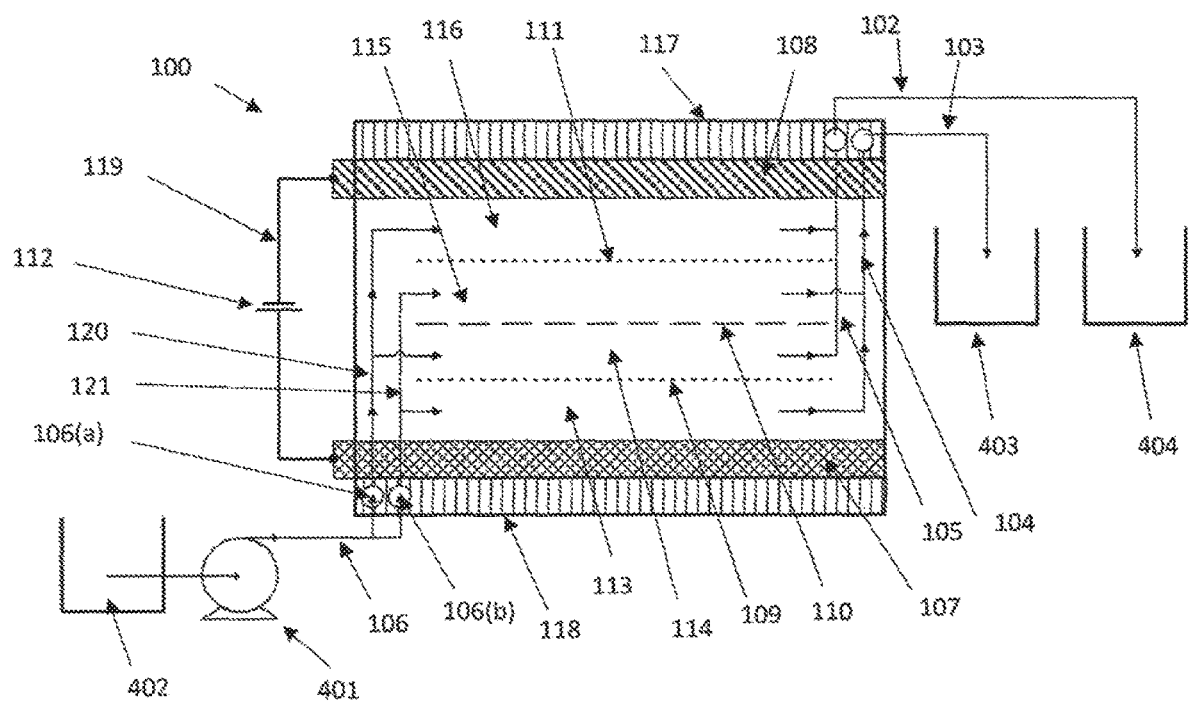
FIG. 4 shows the fluid flow directions for a system in the apparatus when the apparatus is set in the continuous flow configuration.
Figure 5:
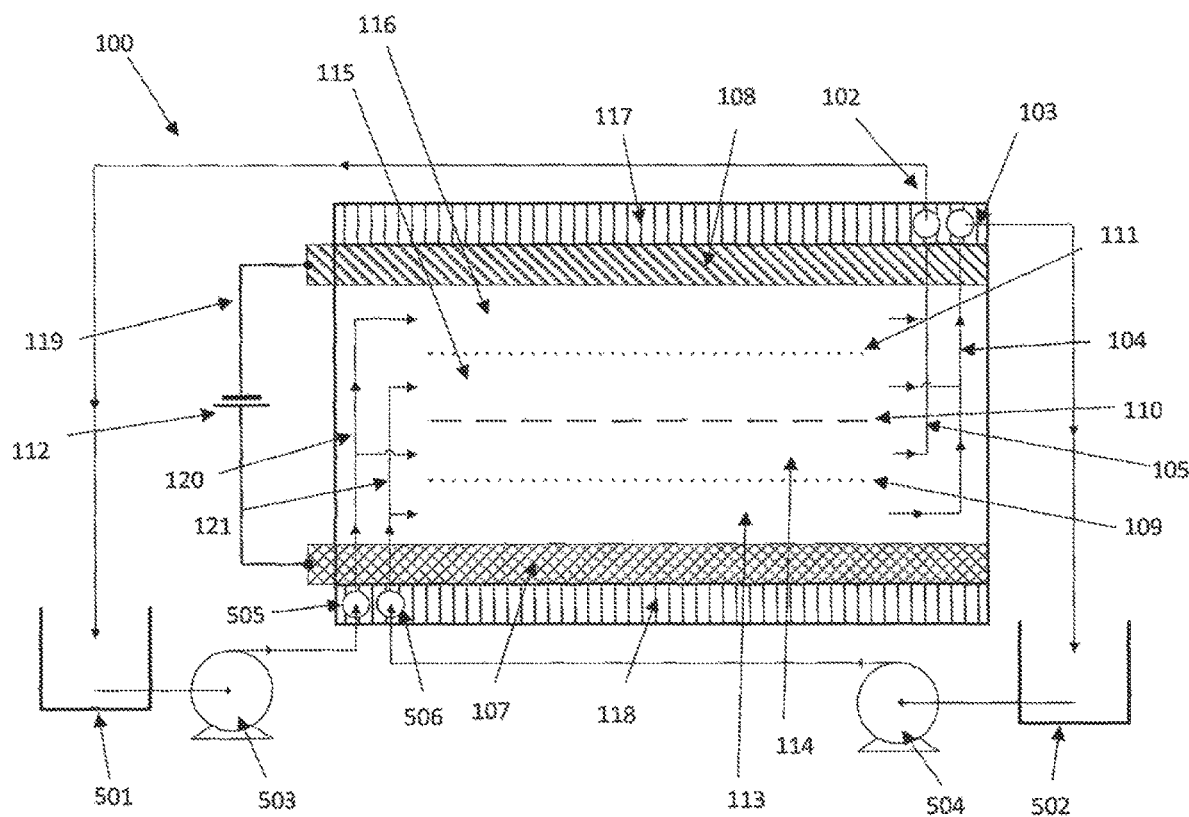
FIG. 5 shows the fluid flow directions for the system in the apparatus when the apparatus is set in a batch configuration.

In another embodiment, the apparatus 100 or system described herein is run in different modes depending on the customer requirements. In a related embodiment, the apparatus or system can be run in a continuous mode as shown in FIG. 4 or a batch mode as shown in FIG. 5. In yet another embodiment, the flow rates and the salt removal rate can be increased by putting multiple stages together in parallel and/or series configurations as show in FIG. 6 and FIG. 7, respectively. In still yet another embodiment, the rate of salt removal is increased by increasing the applied current at the expense of the systems efficiency.

FIG. 4 shows an embodiment of the apparatus in a continuous flow configuration. The apparatus 100 in this figure comprises an ion exchange membrane system with three ion exchange membranes, for instance, CEMs 109 and 111, and AEM 110. In this figure, a fluid to be processed is delivered to the apparatus 100 by a pump 401 from a reservoir 402. The pump 401 forces the fluid into an inlet manifold 106 that separates the stream into a fluid to be processed and a fluid to be concentrated with salt or brine solution. The fluid passes through the inlet(s) 106a and 106b of the desalination system then separates into a number of streams internally through internal manifolds 120 and 121 in order to be processed. The fluids are collected in separate manifolds 104 and 105 that are internal to the system prior to passing the isolated outlet manifolds 102 and 103. The process stream is collected in a tank 403 and the brine solution is collected in a tank 404 upon exiting the outlet manifolds 103 and 102, respectively.

FIG. 5 shows the setup of the apparatus 100 in a batch configuration where the fluid to be processed is separated into two tanks 501 and 502. The left tank 501 contains the fluid to be concentrated into a brine solution. The right tank 502 contains the fluid that will be processed to reduce the salt concentration. The brine solution is pumped by a dedicated pump 503 into the desalination system through an isolated inlet 505 where the solution will be distributed between different chambers by an internal manifold 120. After passing through the membrane assembly chambers 114 and 116, the brine solution is collected by a dedicated internal manifold 105 prior to exiting an isolated outlet manifold 102 and returning to the brine solution tank 501. The process solution is pumped by a dedicated pump 504 into the desalination system through an isolated inlet 506 where the process solution is distributed between different chambers by an internal manifold 121. After passing through the membrane assembly chambers 113 and 115, the processed fluid is collected by dedicated internal manifold 104 prior to passing through an isolated outlet manifold 103 and returning to the process solution tank 502. This method allows the operator to further treat and concentrate the brine and process streams to a desired concentration in batches. For instance, an operator could select a target TDS for the system and it would run until the process stream achieved that treatment level.

Figure 6:
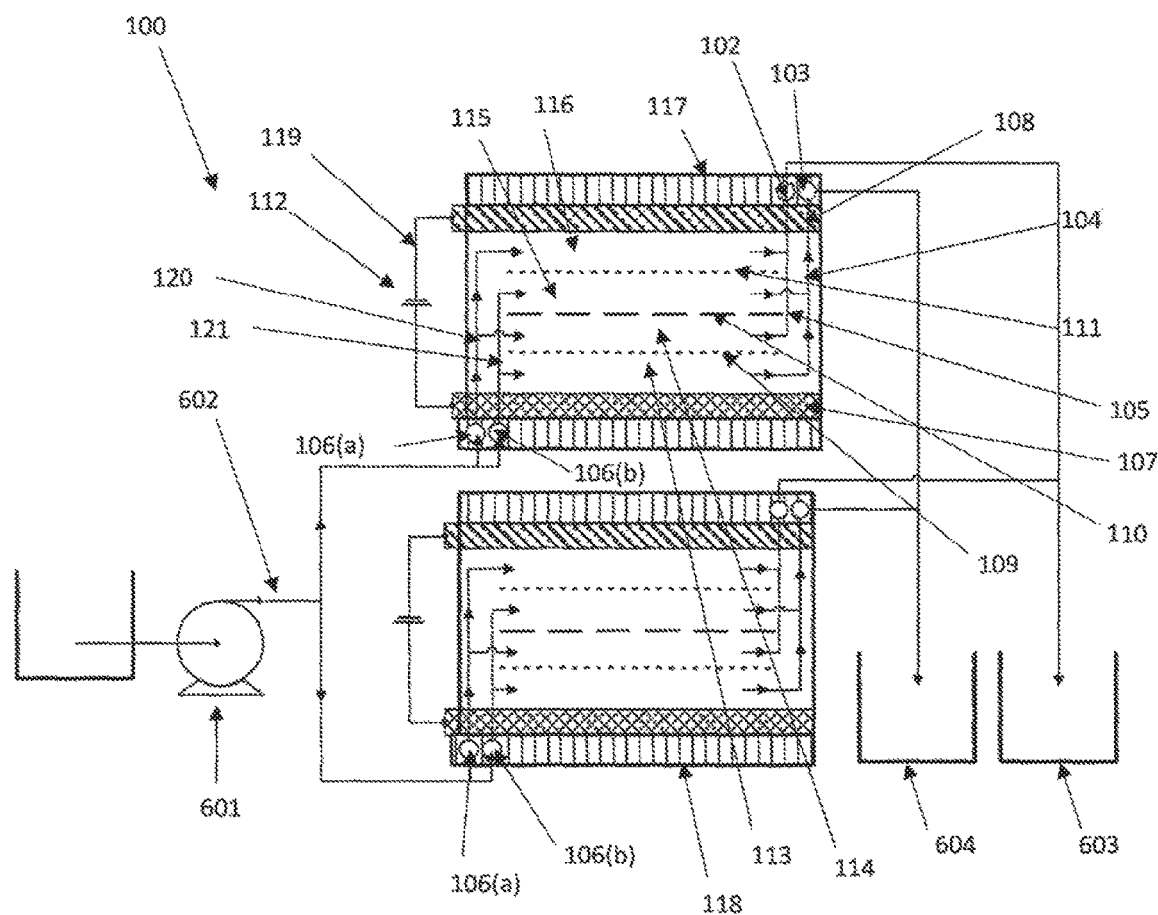
FIG. 6 shows that the apparatus can be placed in parallel to dramatically expand the water treatment capacity.

FIG. 6 is an embodiment with increased capacity by utilizing several desalination apparatus 100 in parallel. The water to be processed is pumped into the apparatus 100 by means of pump 601 and distributed between the desalination systems in a manifold 602 that evenly divides the flows between the apparatuses. The diluate fluids exit the cells via outlet 103 and recombine in the product tank 604. The concentrated fluid, or brine, exit the cells from a separate outlet 102 and recombines with the other concentrate fluids in the brine tank 603.

Figure 7:
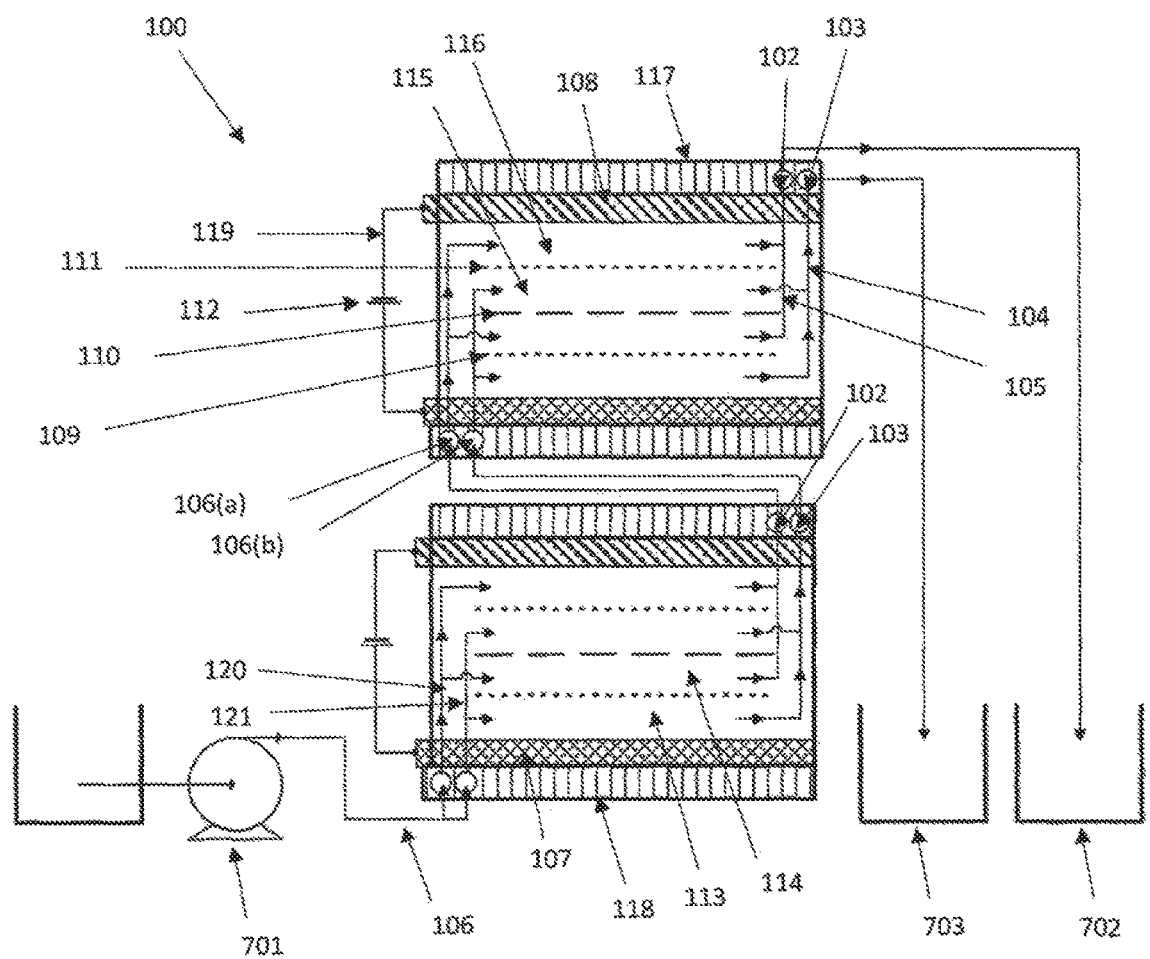
FIG. 7 shows that the apparatus can be placed in series to reduce the TDS levels in several stages.

FIG. 7 is an embodiment that demonstrates the ability to process a fluid in multiple stages arranged in series. The fluid to be processed is supplied by at least one pump 701 to the desalination apparatus 100 where the salt concentration is reduced in the first stage then reduced further in the second stage. This arrangement allows for a greater reduction in salt concentration in the fluid to be processed and greater increase in the concentration of the brine solution to be discharged. The figure shows multiple apparatuses 100, where the first apparatus 100 is connected to the second apparatus 100 in such a manner that the brine and process water from the first apparatus 100 is transferred from the outlets 102 and 103 to the inlets 106a and 106b of the second apparatus 100. The brine and process water from the second apparatus 100 is transferred out of outlets 102 and 103, respectively into tanks 702 and 703, respectively.

Figure 8:
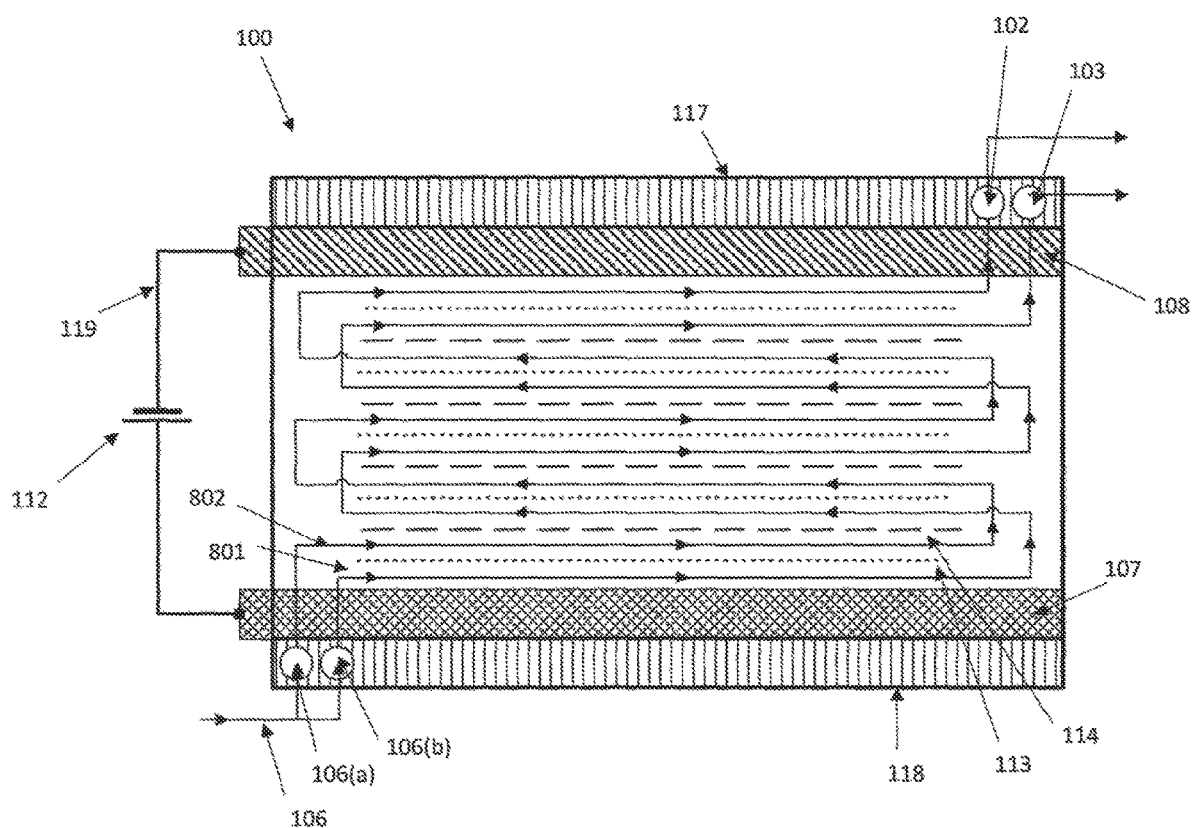
FIG. 8 shows that the apparatus can be internally configured in a serpentine pattern which can increase the TDS removal rate per stage while decreasing the capacity.

FIG. 8 is an embodiment with a serpentine flow path internal to the desalination system. The process fluid is brought into the desalination system by a single manifold 106 which subsequently separates the flow into two streams via inlets 106a and 106b. The separate streams then pass into dedicated inlets 801 and 802 into the first chamber 113 and second chamber 114, respectively. The process fluid and brine solution are isolated from each other with dedicated flow channels that pass through the entire length of the desalination system. The fluids then pass through dedicated, isolated outlets 102 and 103 as described earlier. This arrangement allows for a greater degree of a salt concentration reduction in a single desalination system, and reduces the capacity of fluid able to be processed by the system.

Figure 9A:
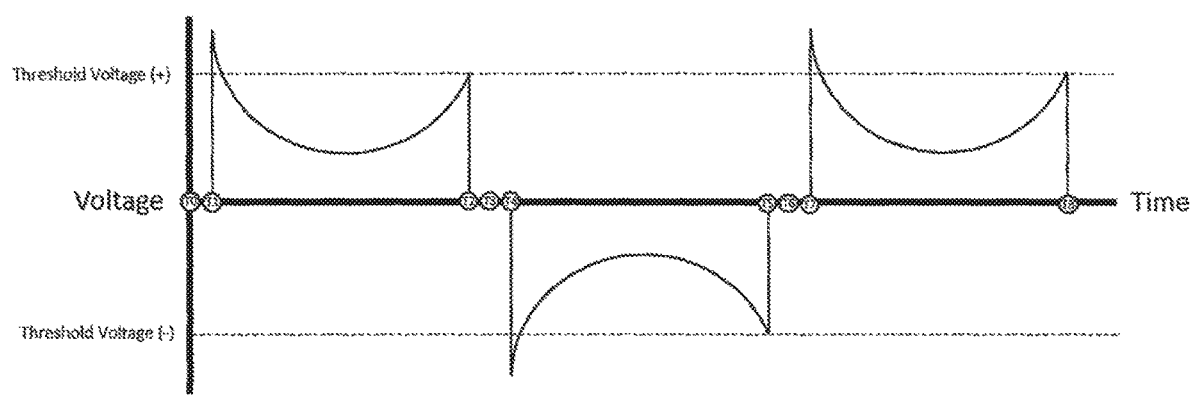
FIGS. 9A-9B show the voltage profile, valve positions and flow paths for the apparatus described herein.

FIG. 9A shows a typical voltage profile/voltage plot for the apparatus operating under constant current. The profile switching from a positive to negative voltage demonstrates the ability to reverse the polarity in the system. The state diagram/valving schedule below in Table 1 exemplifies a possible method for switching the diluate and concentrate streams upon reversal of the electrode polarity.

Table 1 shows the state diagram/valving schedule for the apparatus operating under constant current

| Time | Valve 1 (V1) | Valve 2 (V2) | Valve 3 (V3) | Valve 4 (V4) | Power |
| --- | --- | --- | --- | --- | --- |
| T0 | Open | Open | Closed | Closed | Off |
| T1 | Closed | Open | Open | Closed | +VDC |
| T2 | Closed | Open | Open | Closed | Off |
| T3 | Open | Open | Closed | Closed | Off |
| T4 | Open | Closed | Closed | Open | −VDC |
| T5 | Open | Closed | Closed | Open | Off |
| T6 | Open | Open | Closed | Closed | Off |
| T7 | Closed | Open | Open | Closed | +VDC |
| T8 | Closed | Open | Open | Closed | Off |

Figure 9B:
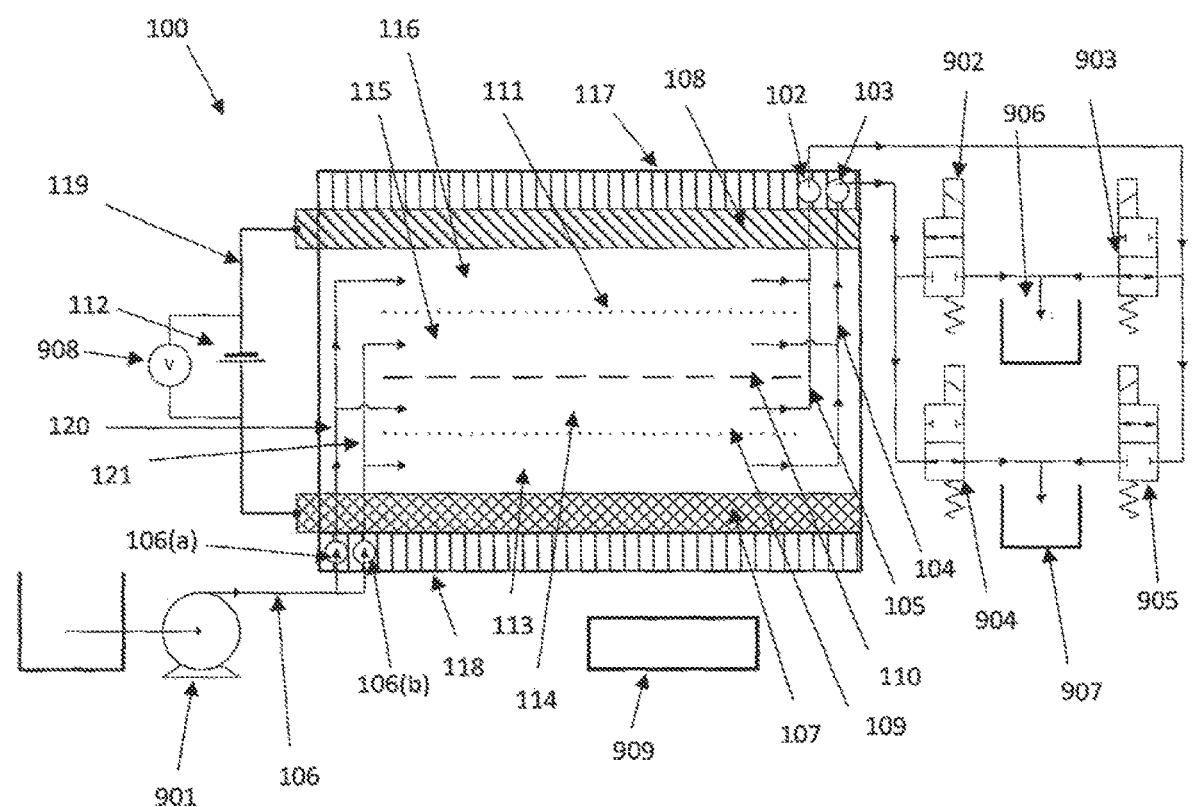

FIG. 9B is an embodiment demonstrating the first state of the state diagram from FIG. 9A. This embodiment includes a pump 901 that pumps the aqueous solution into the apparatus 100 and a DC power supply 112 with a controller 908 that is capable of switching the polarity of the DC power supply. The 2-way 2-position valves 902, 903, 904 and 905 to the right of the desalination system demonstrate the positions at state 1. The subsequent states allow the fluid to be directed to either the processed solution tank 907 or the brine tank 906. The valve positions and voltage polarity are controlled by a programmable logic controller (PLC) 909, which can either be mounted in the field with the unit or remotely.

In another embodiment, the present invention described here in uses separate electrolyte from the process and brine solutions to fill the chambers in direct contact with the anode and cathode surfaces, i.e. anolyte and catholyte, respectively. In a related embodiment, the catholyte and anolyte composition in such apparatus will range from high to low concentration or may be of differing concentrations. Using separate electrolytes for electrode chambers will allow for differing flow conditions between the process fluid and the electrode fluid. The flow conditions in the electrode chamber can be made to be turbulent to enhance rates of reaction on the electrode surface by shortening the diffusion boundary layer. This can increase the limiting current density of the electrode and allow for a higher ionic flow rate across the cell. This configuration allows for fluids with chemistries that may have deleterious side reactions at the electrode surface to be processed by the system while maintaining optimal anolyte and catholyte compositions in the electrode compartments. Similarly, this embodiment allows for non-aqueous chemistries and additives to be introduced to the electrolyte solutions without the risk of contaminating the process water. In another embodiment, the fluids in the electrode chambers may be connected into a single manifold at the outlet and recycled to the inlet to maintain a constant inlet concentration. Maintaining a constant concentration in the electrode chambers alleviates the negative effects of depleting chloride ions in the anode chamber. These negative effects include increased electrical resistance and reduced rates of reaction at the anode surface.

Figure 10:
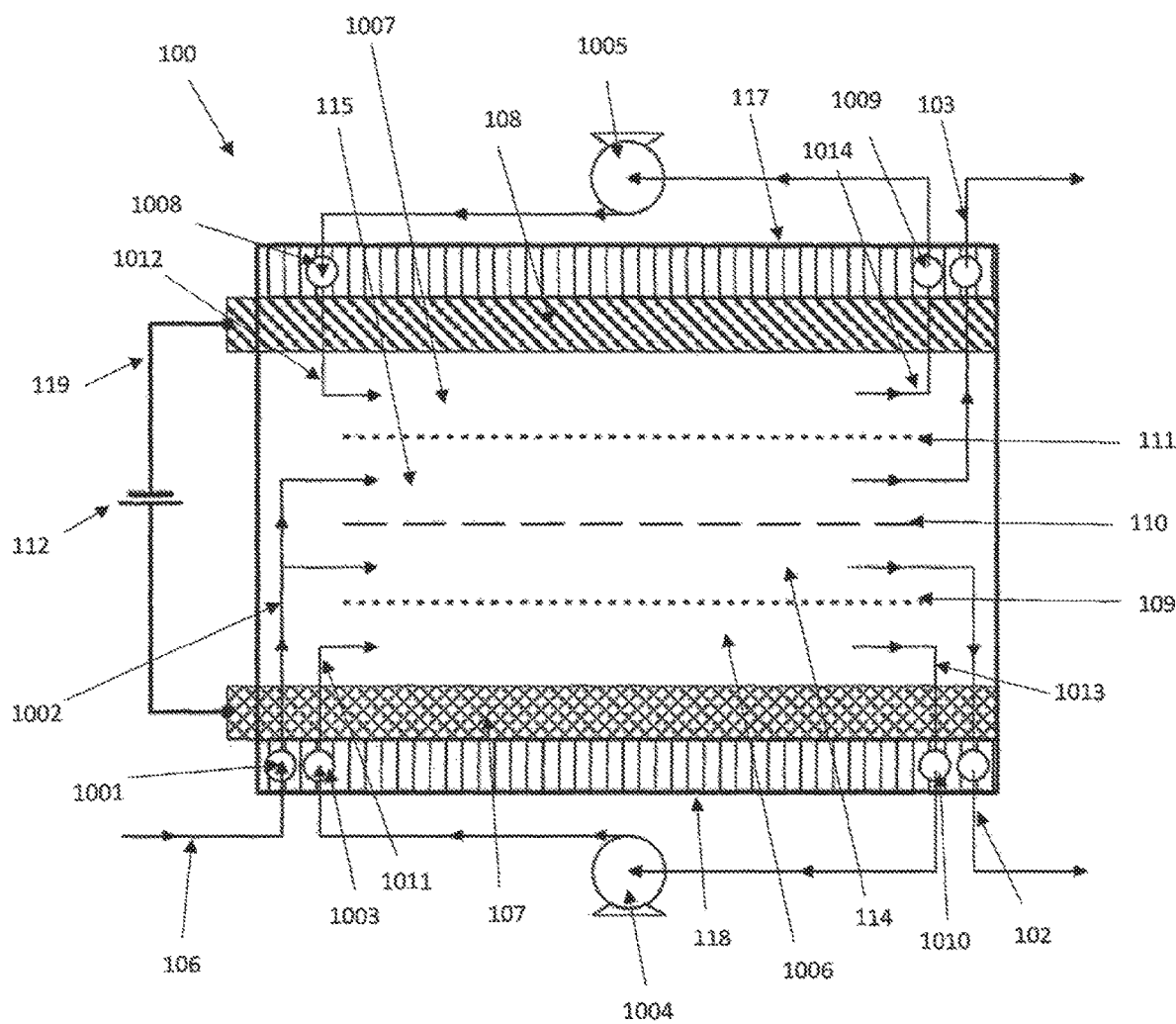
FIG. 10 shows a configuration for the system in the apparatus that isolates a catholyte and an anolyte from the process fluids. An alternate configuration for the system would be where these two streams combine in a single manifold.

FIG. 10 is an embodiment demonstrating the ability to have separate fluids for anolyte and catholyte. The fluid processed by the desalination system is brought into the system through a dedicated inlet 1001 into an isolated internal manifold 1002 where it is distributed into process chamber 115 and concentrate chamber 114 and out through outlet manifolds 103 and 102, respectively. The anolyte is recirculated by pump 1004 through inlet 1003 into manifold 1011 then through anode chamber 1006 and out through manifold 1013 and outlet 1010. Similarly, the catholyte is recirculated by pump 1005 through inlet 1008 into manifold 1012 then through cathode chamber 1007 and out through manifold 1014 and outlet 1009. In one embodiment, the apparatus 100 in this case comprises at least one cationic exchange membrane and at least one anionic exchange membrane placed in between the at least one electrode set. In yet another embodiment, the apparatus 100 comprises a cationic exchange membrane placed near the cathode, another cationic exchange placed near the anode and an anionic exchange membraned placed in between the two cationic exchange membranes as shown in FIG. 10. In further yet another embodiment, the apparatus comprises more than one cationic exchange membrane and more than one anionic exchange membrane, wherein one of the anionic membranes is placed in between two cationic exchange membranes. The anolyte and catholyte may either be recirculated separately as pictured in FIG. 10 or collected in a single manifold in order to maintain the electrolyte concentration within a range of concentrations. In another embodiment, the anolyte and catholyte streams contain surge tanks to maintain the volume, provide a buffer against changes in pH and allow the addition of chemicals or makeup fluids. In yet another embodiment, the anolyte and catholyte are pumped to a common manifold and tank to allow the solutions to mix and maintain a desire concentration. Separating the electrode chambers from the process chambers allows for greater flexibility in water to be treated and the ability to modify the flow characteristics and chemistry of the electrode chamber solutions.

The unique and novel features of the apparatus disclosed in the present invention include but are not limited to the following: (1) it can reduce the energy consumption and make desalination less expensive, and in some cases, convert an otherwise uneconomical situation into a profitable one; (2) it can operate at low pressures (<100 psig), which enables it to use low cost materials like PVC compared to the high operating pressure of reverse osmosis (>800 psig) that requires duplex and super duplex stainless steels, which are very expensive; (3) it operates as low as 10 ppm all the way to 175,000 ppm, which provides the process designers a much simpler selection process; (4) it has minimal off gassing because the electrode materials participate in the reactions as opposed to inert materials used in other electrochemical processes, thereby simplifying the system by not requiring gas collectors at the anode and cathode.

As used herein, the term "current collector" relates to conductive surfaces used to carry electric current to and from the electrodes. This device will be connected to external circuitry, power supplies, etc. by an electrical connection to a wire.

As used herein, the term "spacer" refers to a structure used to separate individual membranes from each other and from the electrode surfaces.

As used herein, the term "support" refers to a structure used to separate individual membranes from each other and from the electrode surfaces in order to define a fixed intermediate volume.

As used herein, the term "gasket" refers to a component used to create a seal between regions of different pressures or substances.

As used herein, the term "stage" refers to one set of electrodes and membrane assembly.

As used herein, the term "membrane assembly" refers to the collection of membranes, spacers and gaskets located between a set of electrodes.

As used herein, the term "system" refers to the electrode set, the membrane assembly and the collection of pipes, controls, valves and power supplies combined to make the desalination unit.

As used herein, the term "mechanical means" to reverse the system refers to a method in which the electrodes may be physically replaced or interchanged.

As used herein, the term "desalination" refers to a process or method used to lower the salt concentration of aqueous solution, thus, treating or desalinating the solution. The term "desalinate" as used herein generally refers to reducing a concentration of salt in aqueous solution, and includes, e.g., circumstances and situations in which an amount of salt has been removed from water, but the desalinated water still includes a low or relatively low concentration of the salt.

As used herein, the term "permselectivity" refers to preferential permeation of certain ionic species through ion-exchange membranes.

As used herein, the term "cationic exchange membrane" refers to membrane with pores that selectively allow the passage of positively charged ions, or cations. For instance, the cationic exchange membrane may include but is not limited to a polymer membrane pretreated in sodium chloride, where the membrane comprises groups that include but are not limited to sulfonic acid functional group, carboxylic acid, phosphonic acid, monosulfate ester, mono- and diphosphate ester groups, hydroxylic groups of phenol, thiol, perfluoro tertiary alcohol groups, or other functional groups that provide a fixed negative charge or derivatives or analogs thereof.

As used herein, the term "anionic exchange membrane" refers to a membrane with pores that selectively allow the passage of negatively charged ions, or anions. For instance, the anionic exchange membrane may include but is not limited to a polymer membrane pretreated in sodium chloride, where the membrane comprises groups that include but is not limited to primary, secondary, or tertiary amino groups, quaternary ammonium functional group, tertiary sulfonium groups, quaternary phosphonium groups, cobaltocenium groups, or other functional groups that provide a fixed positive charge or derivatives or analogs thereof.

As used herein, the term "anolyte solution" refers to an electrolyte solution in used to react with the anode in an electrolytic cell. For example, this includes but is not limited to an aqueous salt solution containing chloride ions provided by a dissolved salt, including but not limited to sodium chloride or potassium chloride.

As used herein, the term "catholyte solution" refers to an electrolyte solution used to react with the cathode in an electrolytic cell. For example, this includes but is not limited to an aqueous salt solution containing chloride ions provided by a dissolved salt, including but not limited to sodium chloride or potassium chloride.

As used herein, the term "plate" refers to a structure on above and below the electrode and membrane assembly that can hold the electrode and membrane in place. For instance, the "plate" include but is not limited to a "top compression plate" or a "bottom compression plate."

As used herein, the term "top compression plate" refers to a plate located on top of the electrode and membrane assembly that with the bottom compression plate holds the electrode and membrane in place. For instance, the apparatus 100 comprises a top compression plate 117 that is located on the top of the electrode and membrane assembly.

As used herein, the term "bottom compression plate" refers to a plate located below the electrode and membrane assembly that with the top compression plate holds the electrode and membrane in place. For instance, the apparatus 100 comprises a bottom compression plate 118 that is located below the electrode and membrane assembly.

As used herein, the term "manifold" refers to a chamber or collection of chambers connected into a single chamber meant for the passage of fluids. For instance, the apparatus 100 comprises inlet manifold that distributes the solution to be processed into the membrane chambers and outlet manifolds that collects and combines processed water and brine solutions as it exits the membrane chambers into two separate streams.

As used herein, the term "casing" refers to any enclosure or structure used to encapsulate, insulate and/or seal the electrodes, membrane assembly and internal fluid pathways from the environment. The casing may be a single separate component or collection of components including but not limited to compression plates, electrodes, membranes, spacers, gaskets and fittings used to accomplish the sealing of the internal fluid pathways. The casing may comprise one piece or may comprise multiple pieces, for instance, a combination of casing and a plate.

As used herein, the term "aqueous solution" refers to a solution that is delivered into the apparatus, wherein the solvent in the solution is water.

As used herein, the term "water" refers to salt water, brine, or desalinated water that is either delivered into or out of the apparatus described herein.

As used herein, the term "fluid" encompasses liquid or gas.

The foregoing descriptions of the embodiments of the present invention have been presented for purposes of illustration and description. They are not intended to be exhaustive or to limit the present invention to the precise forms disclosed. The exemplary embodiments were chosen and described in order to best explain the principles of the present invention and its practical application, to thereby enable others skilled in the art to best utilize the present invention.

What is claimed is:

1. An apparatus, comprising:
a casing comprising at least two outlets and at least one inlet manifold, said at least one inlet manifold carries the aqueous solution into the apparatus; wherein said casing defines an internal space between said at least one inlet manifold and outlets;
at least one electrode set displaced in the internal space and in communication with an aqueous solution to be desalinated, said electrode set comprising:
a cathode, wherein said cathode is made of material that reversibly reacts with chloride and is insoluble in water;
and an anode, wherein said anode is made of material that reversibly reacts with chloride and is insoluble in water, wherein a current collector is attached to said cathode, the anode or both by electrical connection;
an ion exchange membrane system comprising at least one cationic exchange membrane or anionic exchange membrane or both placed in between said at least one electrode set and in communication with the aqueous solution;
and a connector electrically connecting the cathode and the anode to an electrical power supply to form an electrical circuit.

2. The apparatus of claim 1, further comprising:
a valving system comprising:
a 4-way, 2 position valve or more than one 2-way, 2-position valves.

3. The apparatus of claim 1, further comprising:
at least two outlet manifolds, said outlet manifolds located inside the apparatus and connected to each of said outlets individually.

4. The apparatus of claim 1, wherein direction of flow of charged particles in the apparatus is reversed by changing the polarity on the electrical circuit.

5. The apparatus of claim 1, wherein at least one of said two outlets is an outlet for aqueous brine solution and at least one of said two outlets is an outlet for desalinated water.

6. The apparatus of claim 1, wherein at least one inlet is an inlet for salinated aqueous solution.

7. The apparatus of claim 1, wherein said cathode is made of silver and coated with chloride.

8. The apparatus of claim 7, wherein said cathode is coated by hot dipping, cold dipping, electro-deposition, immersion or a combination thereof.

9. The apparatus of claim 1, wherein said anode is made of silver.

10. The apparatus of claim 1, wherein the current collector is made of titanium, graphite, or a combination thereof, said current collector having a planar, felt, woven cloth structure, or a combination thereof.

11. The apparatus of claim 1, wherein said ion exchange membrane system comprises a cationic exchange membrane.

12. The apparatus of claim 1, wherein said ion exchange membrane system comprises:
a cationic exchange membrane placed near the cathode, another cationic exchange membrane placed near the anode and one anionic exchange membrane placed in between the cationic exchange membranes.

13. The apparatus of claim 1, wherein said ion exchange membrane system comprises:
more than one cationic exchange membrane and more than one anionic exchange membrane, wherein one of the anionic exchange membranes is placed in between two of the cationic exchange membranes.

14. The apparatus of claim 1, wherein the ion exchange membrane comprises a polymer structure comprising:
polytetrafluoroethylene, polyether ether ketone, or gel polystyrene crosslinked with divinylbenzene or analogs or derivatives thereof or a combination thereof.

15. The apparatus of claim 1, wherein the cationic exchange membrane comprises a polymer membrane pretreated in sodium chloride, wherein said membrane comprises sulfonic acid functional group, carboxylic acid, phosphonic acid, monosulfate ester, mono- and diphosphate ester groups, hydroxylic groups of phenol, thiol, perfluoro tertiary alcohol groups, or other functional groups that provide a fixed negative charge or derivatives or analogs thereof or a combination thereof.

16. The apparatus of claim 1, wherein the anionic exchange membrane comprises a polymer membrane pretreated in sodium chloride, wherein said membrane comprises primary, secondary, or tertiary amino groups, quaternary ammonium functional group, tertiary sulfonium groups, quaternary phosphonium groups, cobaltocenium groups or other functional groups that provide a fixed positive charge or derivatives or analogs thereof or a combination thereof.

17. The apparatus of claim 1, wherein space between each membrane of the membrane system is from about 0.005" to about 0.050" or from about 0.001" to about 0.500".

18. The apparatus of claim 1, wherein said apparatus is run in a continuous mode or a batch mode.

19. An apparatus, comprising:
a casing comprising:
at least one inlet to deliver an aqueous solution to be desalinated;
at least one inlet to deliver an anolyte solution;
at least one inlet to deliver a catholyte solution;
at least one outlet to deliver the aqueous solution after desalination;
at least one outlet to deliver the anolyte solution out of the apparatus;
at least one outlet to deliver the catholyte solution out of the apparatus; wherein said casing defines an internal space between said inlets and outlets;
at least one electrode set displaced in the internal space, said electrode set comprising:
a cathode, wherein said cathode is made of material that reversibly reacts with chloride;
and an anode, wherein said anode is made of material that reversibly reacts with chloride;
an ion exchange membrane system comprising at least one cationic exchange membrane and at least one anionic exchange membrane placed in between said at least one electrode set and in communication with the aqueous solution; and
a connector electrically connecting the cathode and the anode to an electrical power supply to form an electrical circuit.

20. The apparatus of claim 19, further comprises:
a pump to deliver the anolyte solution and a pump to deliver the catholyte solution;
or a pump to deliver both the anolyte solution and the catholyte solution.

21. The apparatus of claim 19, wherein the anolyte solution and the catholyte solution are recirculated or collected in a single reservoir.

22. The apparatus of claim 19, wherein the at least one inlet to deliver an anolyte solution and the at least one inlet to deliver the catholyte solution are the same at least one inlet.

23. The apparatus of claim 19, wherein said cathode is made of silver and coated with chloride.

24. The apparatus of claim 23, wherein said cathode is coated by hot dipping, cold dipping, electro-deposition, immersion, or a combination thereof.

25. The apparatus of claim 19, wherein said anode is made of silver.

26. The apparatus of claim 19, wherein a current collector is attached to said cathode, the anode or both by electrical connection.

27. The apparatus of claim 26, wherein the current collector is made of titanium, graphite, or a combination thereof, said current collector having a planar, felt, woven cloth structure, or a combination thereof.

28. The apparatus of claim 19, wherein said ion exchange membrane system comprises:
a cationic exchange membrane placed near the cathode, another cationic exchange membrane placed near the anode and one anionic exchange membrane placed in between the cationic exchange membranes.

29. The apparatus of claim 19, wherein said ion exchange membrane system comprises:
more than one cationic exchange membrane and more than one anionic exchange membrane, wherein one of the anionic exchange membranes is placed in between two of the cationic exchange membranes.

30. The apparatus of claim 19, wherein the at least one cationic exchange membrane or the at least one anionic exchange membrane comprises a polymer structure comprising:
polytetrafluoroethylene, polyether ether ketone, or gel polystyrene crosslinked with divinylbenzene or analogs or derivatives thereof or a combination thereof.

31. The apparatus of claim 19, wherein the cationic exchange membrane comprises a polymer membrane pretreated in sodium chloride, wherein said membrane comprises sulfonic acid functional group, carboxylic acid, phosphonic acid, monosulfate ester, mono- and diphosphate ester groups, hydroxylic groups of phenol, thiol, perfluoro tertiary alcohol groups, or other functional groups that provide a fixed negative charge or derivatives or analogs thereof, or a combination thereof.

32. The apparatus of claim 19, wherein the anionic exchange membrane comprises a polymer membrane pretreated in sodium chloride, wherein said membrane comprises primary, secondary, or tertiary amino groups, quaternary ammonium functional group, tertiary sulfonium groups, quaternary phosphonium groups, cobaltocenium groups or other functional groups that provide a fixed positive charge or derivatives or analogs thereof, or a combination thereof.

33. The apparatus of claim 19, wherein space between each membrane of the membrane system is from about 0.005" to about 0.050" or from about 0.001" to about 0.500".

34. The apparatus of claim 19, wherein the anolyte solution comprises an aqueous salt solution containing chloride ions provided by a dissolved salt, wherein the dissolved salt is sodium chloride or potassium chloride.

35. The apparatus of claim 19, wherein the catholyte solution comprises an aqueous salt solution containing chloride ions provided by a dissolved salt, wherein the dissolved salt is sodium chloride or potassium chloride.

* * * * *